United States Patent [19]

Krude

[11] 4,425,101
[45] Jan. 10, 1984

[54] ANGULARLY MOVABLE UNIVERSAL JOINT

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 331,793

[22] Filed: Dec. 17, 1981

[30] Foreign Application Priority Data

Dec. 20, 1980 [DE] Fed. Rep. of Germany ....... 3048340

[51] Int. Cl.³ ............................................... F16D 3/22
[52] U.S. Cl. .................................... 464/139; 464/141
[58] Field of Search ............... 464/129, 139, 140, 141, 464/142, 143, 145, 906

[56] References Cited

U.S. PATENT DOCUMENTS

| 1,620,285 | 3/1927 | Pollak | 464/141 X |
| 3,069,874 | 12/1962 | Leto | 464/140 X |
| 3,396,554 | 8/1968 | Westercamp | 464/143 X |
| 4,116,020 | 9/1978 | Aucktor et al. | 464/903 X |
| 4,156,354 | 5/1979 | Krude | 464/141 X |
| 4,177,654 | 12/1979 | Aucktor | 464/140 X |

FOREIGN PATENT DOCUMENTS 2634581 12/1978 Fed. Rep. of Germany ... 464/141 X
948539 2/1964 United Kingdom ................ 464/140

*Primary Examiner*—Stuart S. Levy
*Assistant Examiner*—Dao Van Huynh
*Attorney, Agent, or Firm*—Toren, McGeady and Stanger

[57] ABSTRACT

A universal joint with an inner and outer joint member connected in torque transmitting relationship by roller members which are supported in radially extending openings in the inner joint member, the inner joint member being in torque transmitting engagement with a shaft member extending therethrough, the shaft member being formed with recesses having the roller members engaged therein to hold the shaft member and the inner joint member axially fixed relative to each other.

4 Claims, 2 Drawing Figures

ANGULARLY MOVABLE UNIVERSAL JOINT

The present invention relates generally to angularly movable universal joints which are provided with uniformly circumferentially spaced roller members for torque transmitting purposes wherein the roller members are radially movably supported in openings of an inner joint member of the universal joint and are guided in grooves of an outer joint member of the joint.

As indicated in prior art German Patent No. 2,634,581, the roller members of such a universal joint may be at least partially spherically configured and the diameter of the spherical faces thereof may be sufficiently large so that the roller members may be arranged in the joint so as to mutually support each other on their sides facing toward the center of the joint.

In the case of such joint, the inner member of the joint is formed integrally with a shaft connected with the joint and the inner joint member must be formed with openings which are relatively difficult to produce. Thus, a comprehensive process of production for the joint is required. If the inner joint member is produced in two separate parts, then axial securing means must be additionally provided in order that one part may be firmly connected with the other.

Accordingly, the present invention is directed toward provision of a universal joint assembly wherein an inner joint member may be provided in a form which is easy to produce and which may consist of several parts, with the individual parts being capable of being affixed in operative engagement in the joint without the necessity for additional means.

SUMMARY OF THE INVENTION

Briefly, the present invention may be described as an angularly movable universal joint comprising an inner joint member, an outer joint member, roller members operatively interposed in torque transmitting relationship between said inner and outer joint members and a shaft member arrangement in torque transmitting engagement with the inner joint member. The inner joint member is formed with radially extending openings having the roller bodies therein and the shaft member is formed with recess means within which the roller bodies may engage. As a result of the engagement of the roller bodies between the radially extending openings of the inner joint member and the recess means of the shaft member, the inner joint member and the shaft member are maintained in axially fixed engagement relative to each other.

Thus, the objective of the invention is achieved in that the inner joint member is essentially formed as two parts with one component containing the radially extending openings for the roller members and with an axial bore for receiving the shaft. The shaft essentially comprises the second part of the inner joint member which, as viewed in longitudinal section, provides for each of the roller members a recess into which the roller members engage.

The advantage of a design such as that of the present invention is that it is quite easy to produce and that it consists of a shaft which in addition need only be provided with recesses and with a first part having through holes in the form of bores produced depending upon the diameter of the balls forming the roller members. The shaft recess may also be designed as a flattened area into which the balls engage and it may achieve a type of axial fixing which does not require further supporting parts.

In order to achieve ease of production of all of the recesses in the shaft, in accordance with a further feature of the invention, the recesses may be formed as a single annular groove extending around the circumference of the shaft wherein all of the roller members are engaged.

In order to insure a sufficiently high amount of torque transmission from the shaft to the inner joint member, provision is made for the shaft and the inner joint member to be engaged in torque transmitting relationship with each other by means of axially extending splines or longitudinal teeth.

Joints of the type to which the present invention relates may be found in use as driving joints or steering joints in engineering devices and in motor vehicles or in ship constructions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
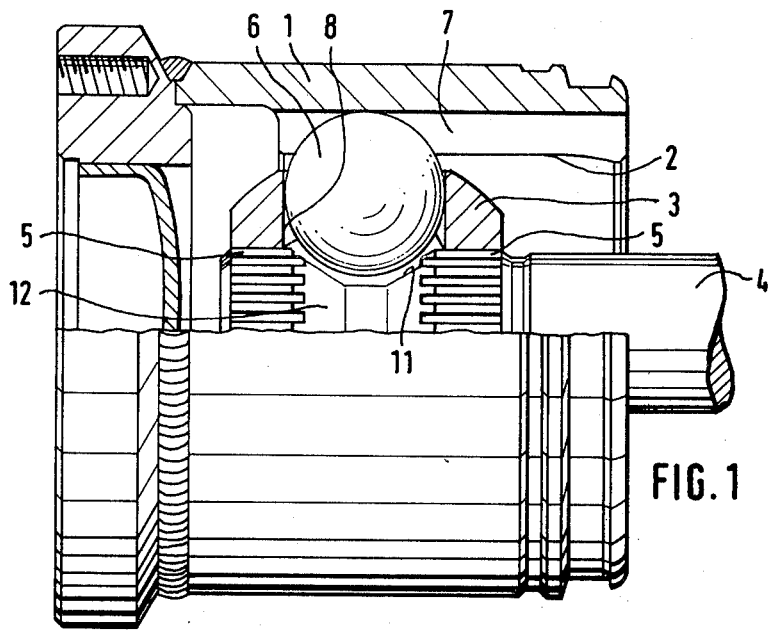
FIG. 1 is a longitudinal view partially in section showing an assembly in accordance with the present invention.
Figure 2:
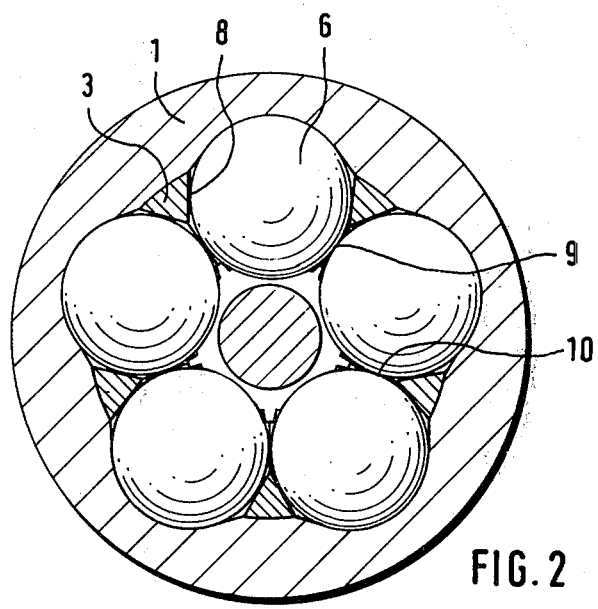
FIG. 2 is a cross-sectional view of the joint shown in FIG. 1.

Referring now to the drawing there is illustrated in FIGS. 1 and 2 thereof a joint assembly in accordance with the present invention which consists essentially of an outer joint member 1 having a hollow space 2 defined therein within which an inner joint member 3 is received. The inner joint member 3 is nonrotatively connected with a shaft 4 to be in torque transmitting engagement therewith by means of two sets of splines 5.

The inner joint member 3 and the outer joint member 1 are connected in torque transmitting engagement by roller members 6 which are formed as spherical balls. The balls 6 are received in grooves 7 of the outer joint member 1. The grooves 7 of the outer joint member 1 extend so as to be parallel to the axis of the joint assembly and thus they receive the balls 6 in a manner which circumferentially affixes the outer joint member 1 with the balls 6.

On the inner side thereof, the balls 6 are engaged within openings 8 formed in the inner joint member 3. The openings 8 of the inner joint member have a cross-sectional area which corresponds to the diameter of the balls 6.

As will be seen in the longitudinal sectional view of FIG. 1, the shaft 4 is provided with recesses 11. The recesses 11 are arranged to cooperate with the openings 8 in the inner joint member 3 in such a manner that the balls 6 are received both in the openings 8 and in the recesses 11 of the shaft 4.

As a result of this arrangement, axial movement of the inner joint member 3 relative to the shaft 4 is prevented due to the engagement of the balls 6 in the recesses 11 and in the grooves 8.

As a result of this arrangement, there is eliminated a need for any additional parts to prevent axial movement between the shaft 4 and the inner joint member 3. Furthermore, it will be seen that the shaft 4 essentially operates to comprise a second part of the inner joint member which is essentially axially fixed relative to the part of the inner joint member labeled with reference character 3.

The openings 8 and the recesses 11 are arranged in such a way that two adjoining openings extend into each other to form a passage 9, as best seen in FIG. 2. The passage 9 permits abutting contact between two adjoining balls 6 at a point 10. As a result, the balls 6 will be held in mutually supporting engagement in a direction radially inwardly of the joint.

In the embodiment of the invention shown in FIG. 1, a single recess 11 is provided for all of the balls 6, with the recess 11 being formed in such a manner that it is essentially composed of an annular groove 12 which extends completely around the circumference of the shaft 4. Thus, the single annular groove 12 has engaged therein each of the balls 6 and as a result of this configuration production of the joint assembly is made easier.

While a specific embodiment of the invention has been shown and described in detail to illustrate the application of the inventive principles, it will be understood that the invention may be embodied otherwise without departing from such principles.

I claim:
1. A universal joint comprising:
    an inner joint member;
    an outer joint member;
    roller members operatively interposed in torque transmitting engagement between said inner and said outer joint members;
    grooves in said inner and outer joint members having said roller members in guided engagement therein and configured to effect rotative driving engagement between said inner and outer joint members;
    a driven member and a driving member, one of said driven and driving members being in rotative driving engagement with said outer joint member;
    torque transmission means connecting the other of said driven and said driving members in torque transmitting engagement with said inner joint member while permitting relative axial movement therebetween;
    recess means in the other of said driving and driven members having said roller members engaged therein in a manner to hold said inner joint member and said other member axially fixed relative to each other;
    said roller members being at least partially of a spherical configuration with said inner joint member and said recess means being structured to hold said roller members so that they are in mutually supporting engagement with each other radially inwardly of said joint;
    said inner and outer joint members and said driving and driven members, respectively, being structured to permit angular articulation of said joint while retaining the torque transmitting capability thereof.
2. A joint according to claim 4 wherein said recess means comprises a continuous annular groove formed around the circumference of said other member having said roller members engaged therein.
3. A joint according to claim 2 wherein said torque transmitting means comprise axially extending spline means formed in both said inner joint member and said other member.
4. A joint according to claim 3 wherein said spline means comprise axially extending splines located on opposite sides of said annular groove taken in the axial direction of said other member.

* * * * *